United States Patent
Luo et al.

(10) Patent No.: US 7,168,133 B2
(45) Date of Patent: Jan. 30, 2007

(54) HINGE FOR A PORTABLE ELECTRONIC DEVICE

(75) Inventors: Xinghuang Luo, Shenzhen (CN); Ying Liang Tu, Shenzhen (CN); Chia-Hua Chen, Shindian (TW)

(73) Assignees: Shenzhen Futaihong Precision Ind. Co., Ltd., Shenzhen (CN); Sutech Trading Limited, Tortola (VG)

( * ) Notice: Subject to any disclaimer, the term of this patent is extended or adjusted under 35 U.S.C. 154(b) by 161 days.

(21) Appl. No.: 10/921,706

(22) Filed: Aug. 18, 2004

(65) Prior Publication Data
US 2005/0050684 A1    Mar. 10, 2005

(30) Foreign Application Priority Data
Sep. 5, 2003    (TW) .............................. 92216114 U

(51) Int. Cl.
   *E05F 1/08*    (2006.01)
   *E05D 11/10*    (2006.01)
(52) U.S. Cl. .............................. 16/303; 16/330; 16/325
(58) Field of Classification Search .................. 16/303, 16/330, 325; 455/575.1, 575.3; 379/433.13, 379/434; 361/683, 803
See application file for complete search history.

(56) References Cited

U.S. PATENT DOCUMENTS 5,628,089 A    5/1997  Wilcox et al.
6,745,436 B2 *  6/2004  Kim ............................. 16/330
6,808,402 B2 * 10/2004  Ryu et al. .................... 439/165
6,886,221 B2 *  5/2005  Minami et al. ............... 16/324
6,904,644 B2 *  6/2005  Oshima et al. ............... 16/330
2004/0244147 A1 * 12/2004  Qin et al. ..................... 16/330
2005/0138771 A1 *  6/2005  Su ............................... 16/330
2005/0220294 A1 * 10/2005  Gupte ................... 379/433.13

FOREIGN PATENT DOCUMENTS

JP    2000192939 A  *  7/2000
JP    2001355371 A  * 12/2001

* cited by examiner

*Primary Examiner*—Robert J. Sandy
*Assistant Examiner*—Andre' L. Jackson
(74) *Attorney, Agent, or Firm*—Wei Te Chung

(57) ABSTRACT

A hinge (300) includes a cam (32), a cam follower (30), a torsional spring (31), and a can (33). The cam includes a round flange (321), with a notch (321b) defined therein. The cam follower connects with the cam, and includes an engaging ring (301) around an open end thereof and a projection (303) on an inner wall thereof. The projection is removably engaged in the notch of the cam. The spring is twisted and attached in the cam follower, with one end fixed on the cam follower and the other end fixed on the cam. The can defines a groove (334) rotatably receiving the engaging ring of the cam follower, and a guiding hole (335) movably receiving the cam. The hinge has a relatively simple and stable unified structure.

20 Claims, 6 Drawing Sheets

HINGE FOR A PORTABLE ELECTRONIC DEVICE

BACKGROUND OF THE INVENTION

1. Field of the Invention

The present invention relates generally to a hinge, and more particularly to a hinge used for folding portable electronic devices. The instant invention relates to a contemporarily filed application titled "HINGE ASSEMBLY FOR FOLDABLE ELECTRONIC DEVICE" and having the same assignee with the instant application.

2. Prior Art

Hinges are almost universally used in modern portable electronic devices such as mobile phones and PDAs (Personal Digital Assistants). These portable electronic devices typically comprise two housings. Hinges are used to join the two housings together, and to enable one housing to be folded upon the other one. Normally, one of the housings is called a body and contains most of the electronic components of the portable electronic device. The other housing is called a cover and contains fewer or even no electronic components.

One kind of hinge is disclosed in U.S. Pat. No. 5,628,089 issued to Scott R. Wilcox et al (the '089 patent). In the '089 patent, as shown in FIG. 8, a hinge includes a cam follower 403, a spring 405, a cam 404, a cam follower 403 and a cap 505. The cam follower 403 is generally a hollow cylinder, being closed at one end and open at the other end. The spring 405, cam 404 and cap 505 are located in the cam follower 403 in that sequence. The cap 505 barely covers the opening of the cam follower 403. At approximately the middle of each slot 423, a hole 435 is defined. The hole 435 spans between an exterior surface 463 and an interior surface 465. The cam 404 has two rails 417 formed on an exterior surface 467 thereof. When cam follower 403 rotates, the cam 404 rotates along with it.

This kind of hinge is convenient insofar as all the components can be assembled into one part before it is used in a foldable portable electronic device. However, the cap 505 is attached to the cam follower 403 by way of barbs 411 of two arms 409 catching in the holes 435 of the cam follower 403. This linkage between the cap 505 and the cam follower 403 is not secure.

Therefore, a hinge with a relatively simple structure is desired to overcome the above-described problems.

SUMMARY OF THE INVENTION

Accordingly, an object of the present invention is to provide a hinge with a relatively simple and stable unified structure.

To achieve the above-mentioned object, a hinge of the present invention includes a cam, a cam follower, a torsional spring, a can, a button and a compression spring. The cam includes a pin, a round flange extending from an end of the pin, and a pair of bars extending from a back of the round flange. The round flange includes a notch and a recessed surface thereon. The cam follower connects with the cam, and has an open end and a closed end. An engaging ring is formed on the cam follower at the open end. A projection formed on an inner wall of the cam follower, the projection engaging in the notch of the cam. The closed end includes another pair of bars therein. The torsional spring is twisted and attached in the cam follower. One end of the torsional spring is fixed between the bars of the cam follower, and the other end of the torsional spring is fixed between the bars of the cam. The can defines a hole movably receiving the pin of the cam, and a groove rotatably receiving the engaging ring of the cam follower. The button includes a post. The compression spring is disposed around the post, which together are received in one end of the can.

Other objects, advantages and novel features of the invention will become more apparent from the following detailed description when taken in conjunction with the accompanying drawings, in which:

DETAILED DESCRIPTION OF THE INVENTION

Figure 1:
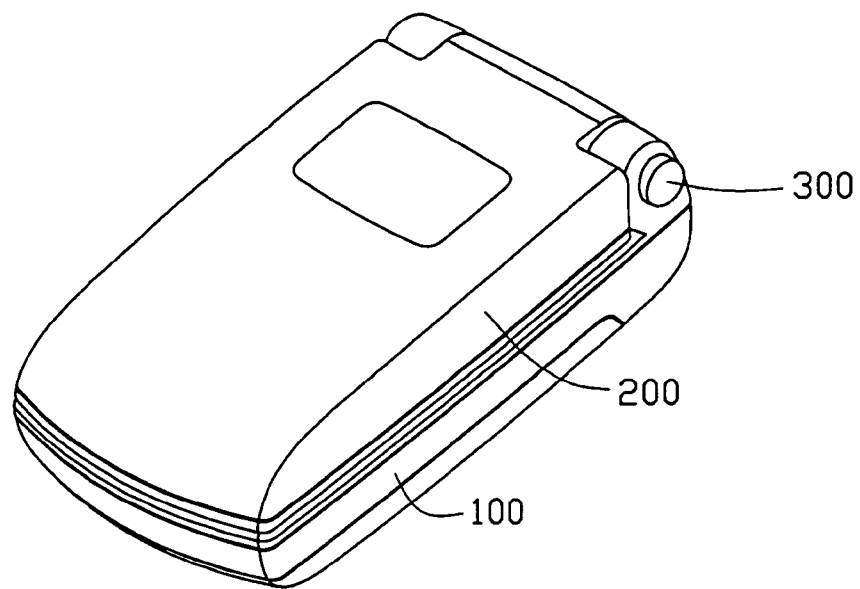
FIG. 1 is an isometric view of a folding mobile radiotelephone in a closed position, the mobile phone incorporating a hinge configured in accordance with the present invention.
Figure 2:
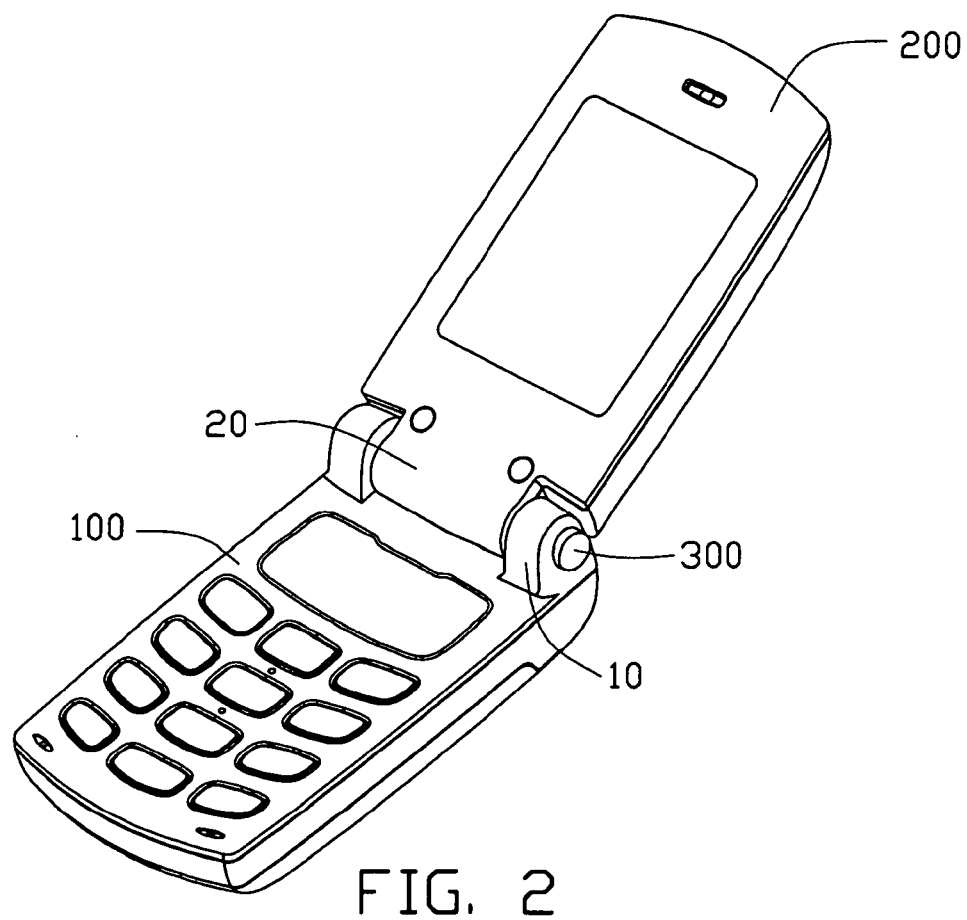
FIG. 2 is similar to FIG. 1, but showing the mobile phone in an open position.

Referring to FIGS. 1 and 2, a folding mobile radiotelephone is shown as an exemplary application for a hinge 300 in accordance with the present invention. The mobile phone includes a body 100, a cover 200, and the hinge 300. The body 100 includes two locating barrels 10. The cover 200 includes a mounting portion 20. One end of the hinge 300 is contained in the mounting portion 20, and an opposite end of the hinge 300 is contained in one of the locating barrels 10. Thus the cover 200 is rotatably connected to the body 100.

Figure 3:
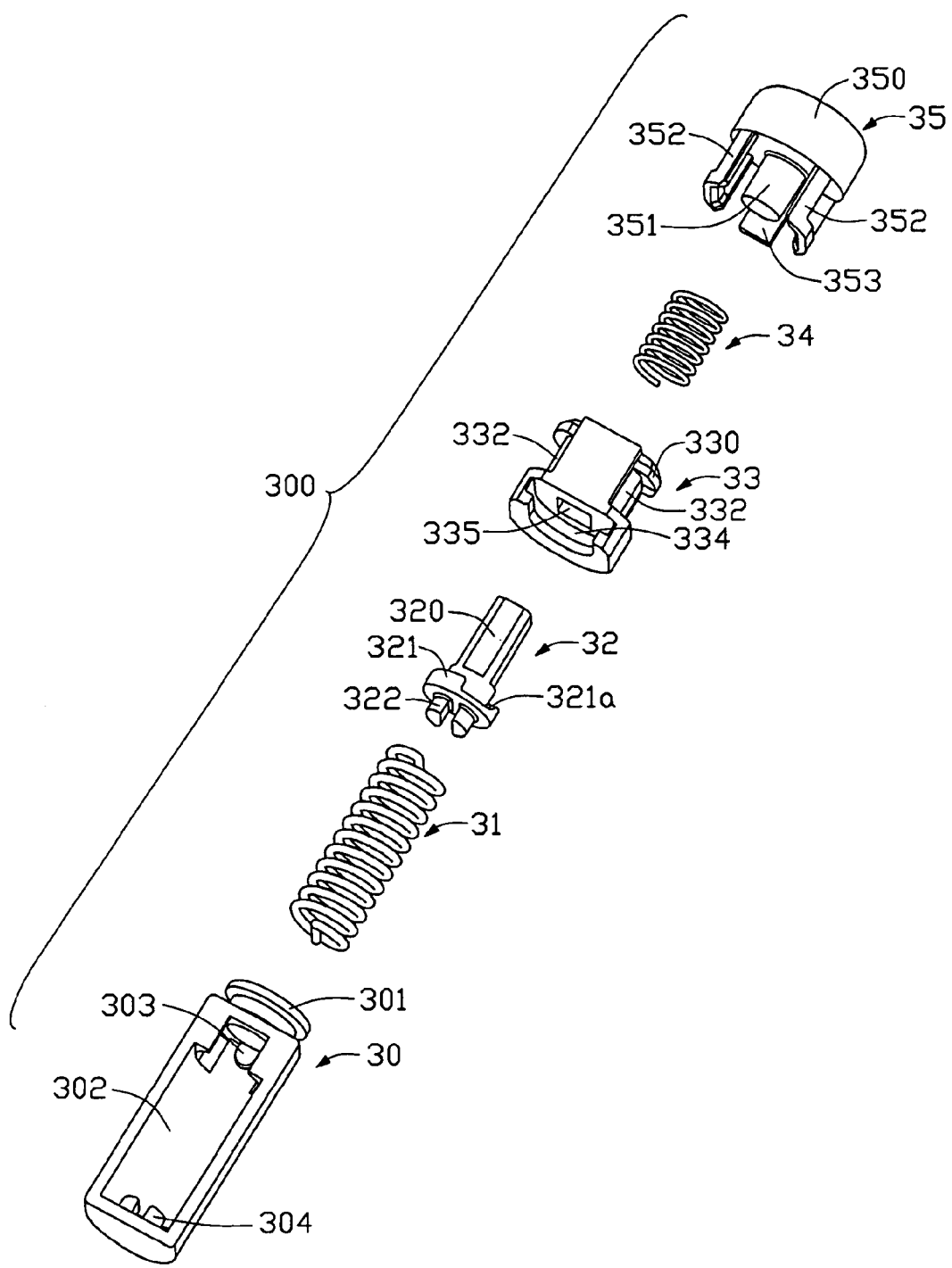
FIG. 3 is an exploded, isometric view of the hinge of the present invention, the hinge including a cam follower, a torsional spring, a cam, a can, a compression spring and a button.
Figure 4:
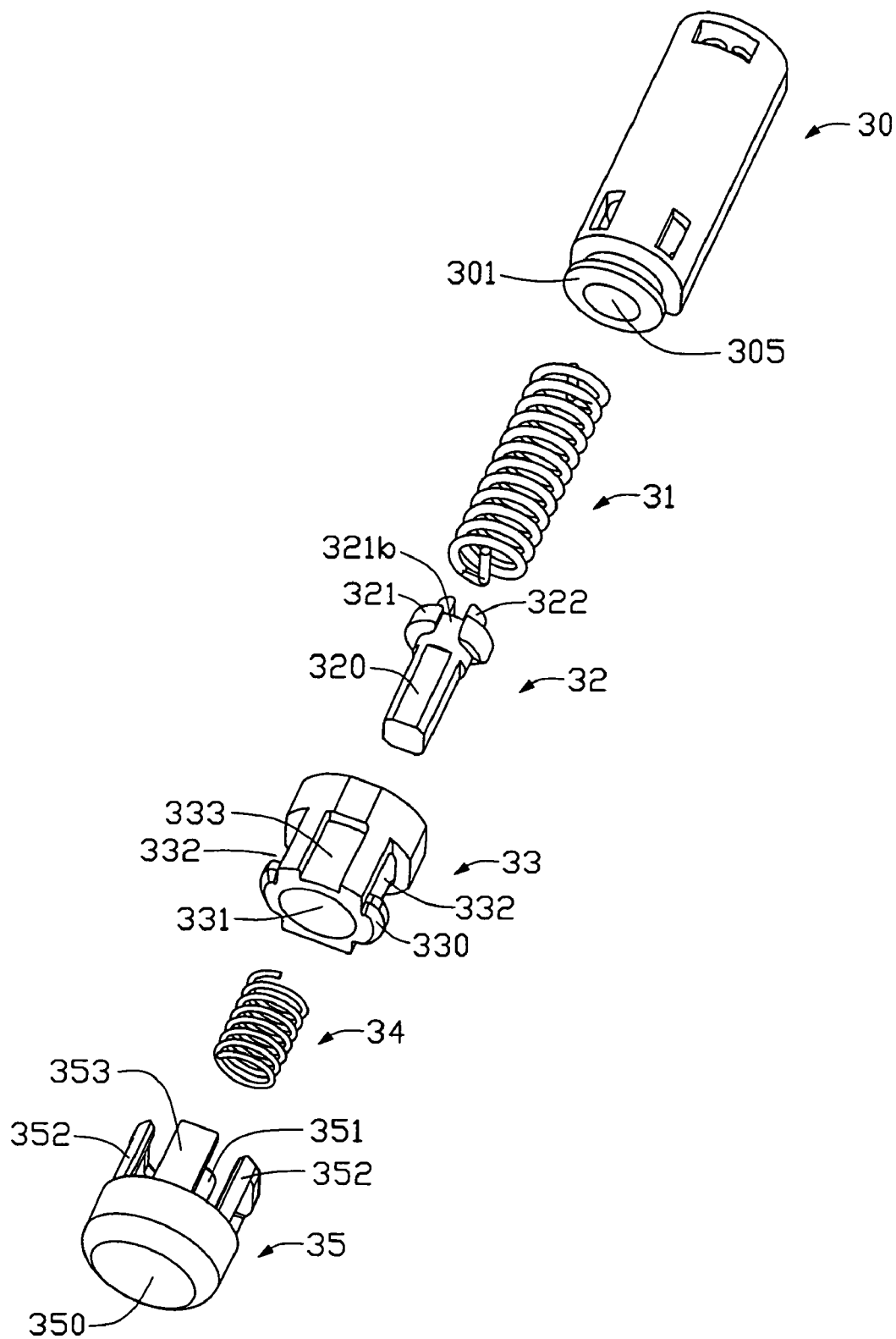
FIG. 4 is an exploded, isometric view of the hinge of the present invention, but viewed from a different aspect to that of FIG. 3.

Referring to FIGS. 3 and 4, the hinge 300 includes a cam follower 30, a torsional spring 31, a cam 32, a can 33, a compression spring 34 and a button 35.

The cam follower 30 is substantially a hollow half-cylinder defining a cavity 302 therein. An engaging ring 301 is formed at one end of the cam follower 30. An opening 305 is defined in the engaging ring 301, the opening 305 being in communication with the cavity 302. A pair of bars 304 and a projection 303 are formed in the cavity 302 at opposite ends thereof. That is, the bars 304 are located at a closed end of the cam follower 30, and the projection 303 is located on an inner wall of the cam follower 30 close to the opening 305.

The cam 32 includes a pin 320, a round flange 321, and two bars 322. The round flange 321 extends from one end of the pin 320, and defines a recessed surface 321a and a notch 321b therein. The bars 322 extend out from an end surface of the round flange 321, opposite to the pin 320.

The can 33 includes two opposite flanges 330 extending out from an end thereof, and defines a semi-cylindrical groove 334 in an enlarged opposite end thereof. A driving hole 331 is defined in a main body of the can 33. A guiding hole 335 is defined in said enlarged end of the can 33. The guiding hole 335 is smaller than the driving hole 331, and intercommunicates between the semi-cylindrical groove 334 and the hole 31. An internal step 336 (see FIG. 6) is formed in the can 33 where the two holes 331, 335 meet. Two parallel guides 332 and a slot 333 are provided at an outer sidewall of the can 33, between the flanges 330 and said enlarged end of the can 33. The guides 332 are formed at two opposite sides of the can 33, and the slot 333 is defined between the guides 332.

The button 35 includes a pressing body 350. A central post 351 extends from a back of the pressing body 350. Corresponding to the can 33, the button 35 includes two arms 352 and a rail 353 arranged around the post 351. The arms 352 are generally rectangular frames. One end of each arm 352 integrally connects with the back of the pressing body 350, with the arm 352 being perpendicular to the pressing body 350. The arms 352 are located at opposite sides of the post 351. The rail 353 also integrally connects with the back of the pressing body 350, with the rail 353 being perpendicular to the pressing body 350. The rail 353 is located between the two arms 352.

The torsional spring 31 and the compression spring 34 are each helical and made of metal. An outer diameter of the torsional spring 31 is slightly less than a diameter of the cavity 302, so that the torsional spring 31 can freely rotate therein. An outer diameter of the compression spring 34 is slightly less than a diameter of the driving hole 331. An inner diameter of the compression spring 34 is slightly larger than a diameter of the post 351, so that the compression spring 34 can freely move in a space cooperatively defined by the post 351 and the driving hole 331.

Figure 5:
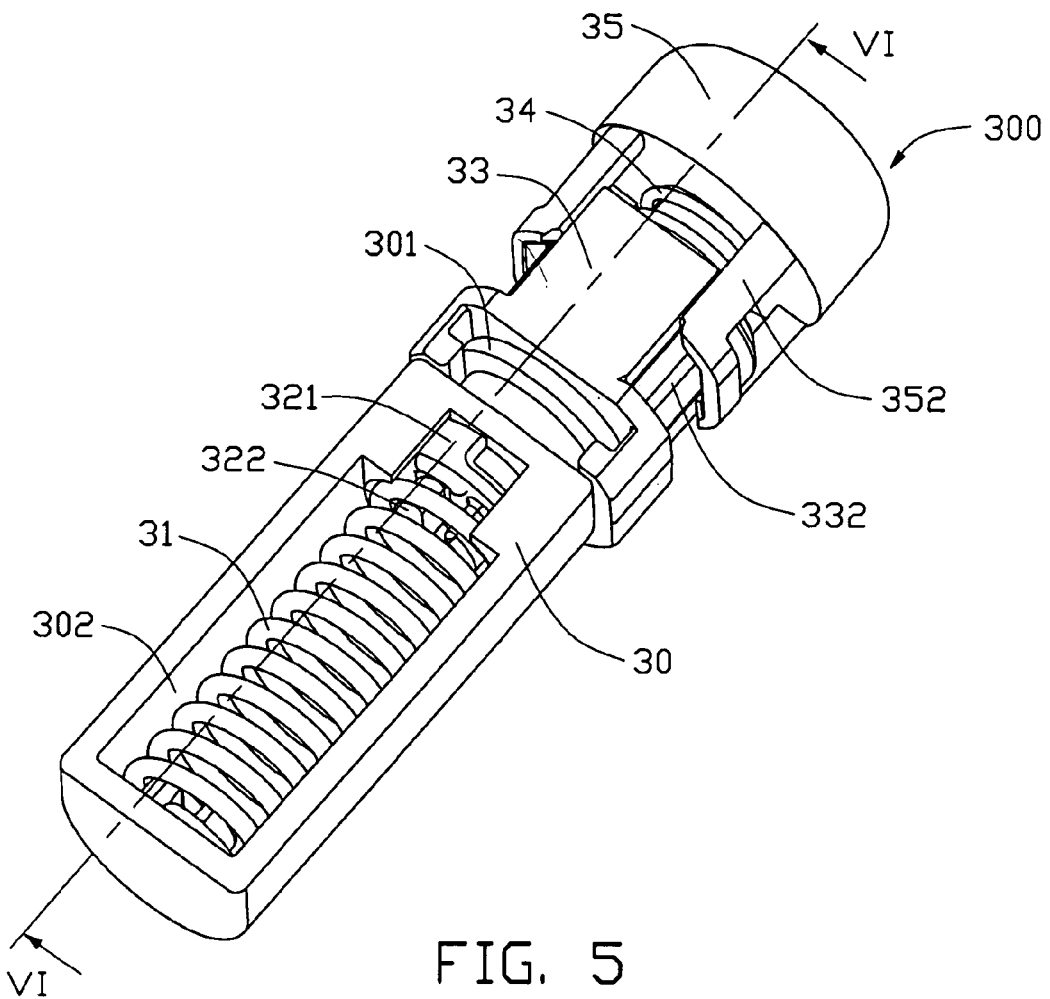
FIG. 5 is an enlarged, assembled view of the hinge of FIG. 3.
Figure 6:
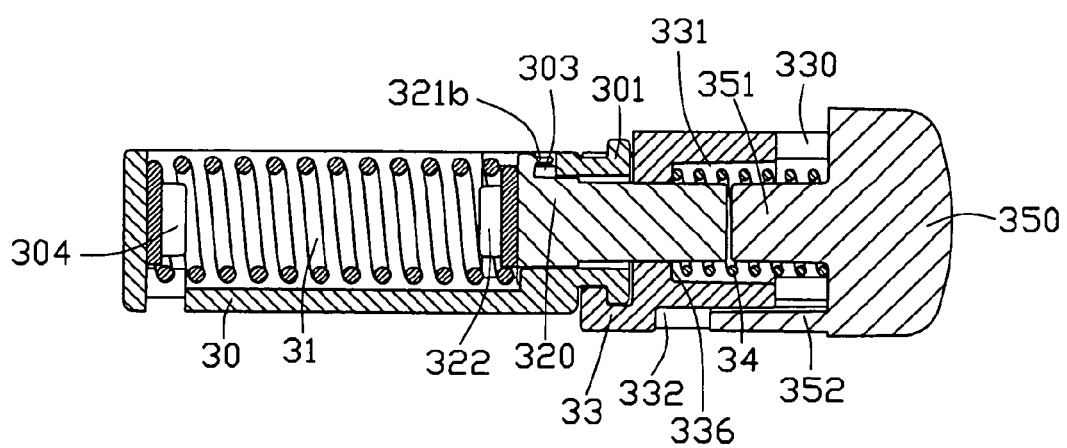
FIG. 6 is a cross-sectional view taken along line VI—VI of FIG. 5.

Referring to FIGS. 5 and 6, in assembly, the torsional spring 31 and part of the cam 32 including the round flange 321 and the two bars 322 are fixed in the cavity 302. The torsional spring 31 is twisted such that it accumulates some elastic potential energy. One end of the torsional spring 31 is mounted on the cam follower 30 between the bars 304, and the opposite end of the torsional spring 31 is locked on the cam 32 between the bars 322. Then the pin 320 of the cam 32 is inserted though the guiding hole 335, so that the engaging ring 301 is rotatably received in the semi-cylindrical groove 334. After that, the compression spring 34 is placed around the post 351. The button 35 is connected to the can 33, with the compression spring 34 and the post 351 being received in the driving hole 331, the rail 353 being located in the slot 333, and the arms 352 being set on the guides 332. The flanges 330 of the can 33 secure the arms 352, so that the arms 352 do not slip off from the guides 332.

In the preferred embodiment of the present invention, the can follower 30 is connected with the mounting portion 20 of the cover 200, and the can 33 is engaged in the barrel 10 of the body 100. Alternatively, the can follower 30 can be connected with the body 100, and the can 33 engaged in the cover 200.

Figure 7A:
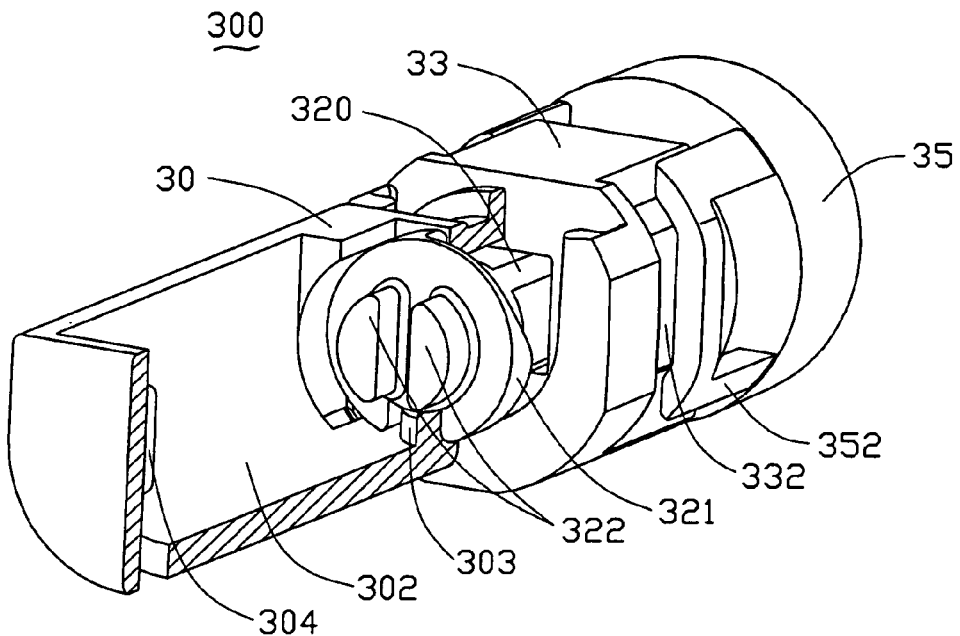
FIG. 7A is substantially a cutaway view of the hinge of FIG. 5, showing the cam follower in a position corresponding to the closed position of the mobile phone.
Figure 7B:
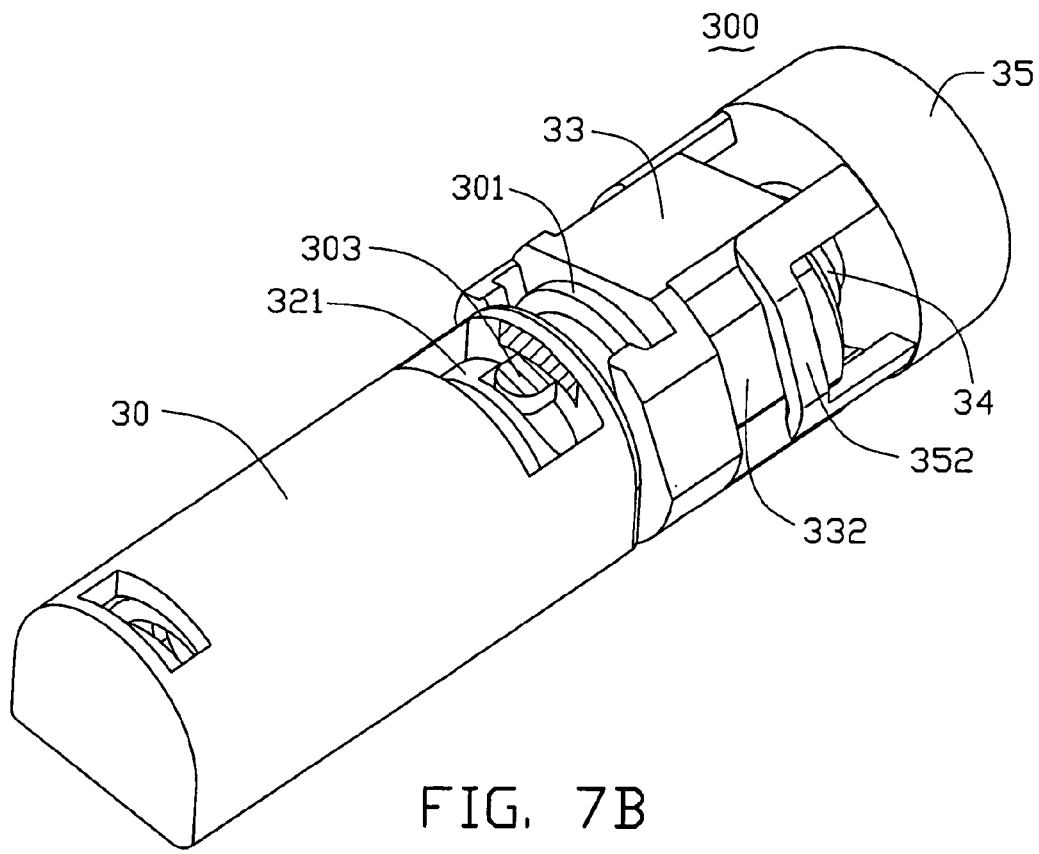
FIG. 7B is similar to FIG. 7A, but showing the cam follower in a position corresponding to the open position of the mobile phone.
Figure 8:
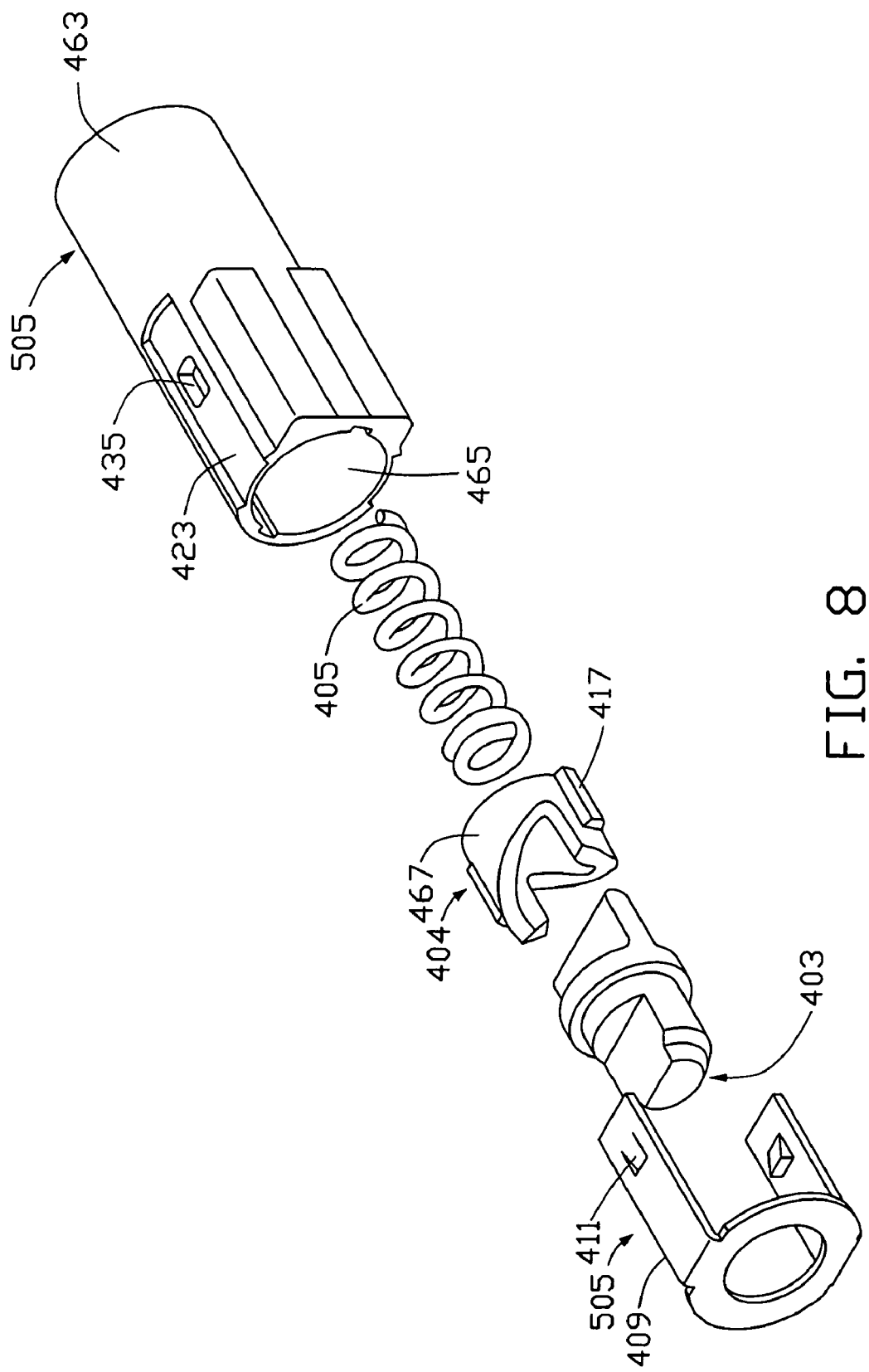
FIG. 8 is an exploded, isometric view of a hinge apparatus of the prior art.

Referring to FIGS. 7A and 7B, when a user pushes the button 35 closer to the cam 32, the arms 352 slide along the guides 332, and the rail 353 slides along the slot 333. The post 351 presses the cam 32, and the compression spring 34 is compressed. Under the force from the button 35, the pin 320 moves in the guiding hole 335, and the round flange 321 goes deeper into the cam follower 30. Thus the torsional spring 31 is compressed. Once the projection 303 has completely moved out of the notch 321b, the potential energy of the torsional spring 31 is automatically released, thereby driving the cam follower 30 to rotate the cover 200. As the cam follower 30 rotates, the projection 303 rides around an annular surface of the round flange 321 and onto the recessed surface 321a. The projection 303 is stopped by a wall of the round flange 321 at an end of the recessed surface 321a. The cover 200 is thus stopped in the open position.

The user then releases the pressure on the button 35, whereupon the compression spring 34 automatically decompresses and drives the button 35 back to its original position relative to the cam 32.

When the user closes the cover 200 onto the body 100, the cover 200 rotates the cam follower 30 back in an opposite direction. The projection 303 rides out from the recessed 321a and along the annular surface of the round flange 321 toward the notch 321b. The torsional spring 31 is twisted such that it accumulates some elastic potential energy. When the projection 303 reaches the notch 321b, the torsional spring 31 decompresses and drives the projection 303 into the notch 321b. The cover 200 is thus secured in the closed position.

Compared with currently known hinges, the hinge 300 of the present invention provides a relatively simple and stable unified apparatus, which enables convenient operation of the mobile phone.

It is to be understood that in an alternative embodiment of the present invention, the cam follower 30 can be unitarily integrated with the mounting portion 20 of the cover 200, with the can 33 being unitarily integrated with one of the barrels 10 and the body 100. In a further alternative embodiment, the cam follower 30 can be unitarily integrated with one of the barrels 10 of the body 100, with the can 33 being unitarily integrated with the mounting portion 20 of the cover 200.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

We claim:

1. A hinge for a portable electronic device, comprising:
   a cam comprising a main body, the main body having a curved flange, the flange defining a notch and a recess;
   a cam follower defining a cavity therein and an open end, the cam follower comprising an engaging portion formed at the open end, and a projection in the cavity near the open end, the projection being received in the notch of the cam;
   a first spring twisted and received in the cam follower for accumulating potential energy, with one end of the first spring fixed on the cam follower, and the other end of the first spring fixed on the cam; and
   a can defining a groove rotatably receiving the engaging portion of the cam follower, and a first hole movably receiving the main body of the cam;
   wherein the main body of the cam can slide but not rotate in the first hole of the can in order to release the projection from the notch, and the first spring can drive the cam follower to rotate relative to the cam such that the projection is received in the recess.

2. The hinge for a portable electronic device as claimed in claim 1, wherein the cam follower further comprises one or more bars for fixing the first spring.

3. The hinge for a portable electronic device as claimed in claim 1, wherein the main body of the cam comprises a pin.

4. The hinge for a portable electronic device as claimed in claim 1, wherein the cam comprises one or more bars for fixing the first spring.

5. The hinge for a portable electronic device as claimed in claim 1, wherein the can further defines a second hole larger than and in communication with the first hole, a step being defined where the two holes meet.

6. The hinge for a portable electronic device as claimed in claim 5, further comprising a button and a second spring.

7. The hinge for a portable electronic device as claimed in claim 6, wherein the button comprises a post having the second spring disposed therearound, the post and second spring being received in the second hole of the can.

8. The hinge for a portable electronic device as claimed in claim 6, wherein the can further comprises one or more guides and a corresponding number of flanges, and the button further comprises a corresponding number of arms, and said arms can slide along said guides, with said flanges holding said arms on said guides.

9. A hinge assembly for a portable electronic device, comprising:
a cam follower;
a cam being rotatably engaged with the cam follower, said cam being linearly moveable relative to the cam follower within a limited range;
a torsion plus compression spring with two ends respectively fastened to said cam and the cam follower; wherein
when said cam is located at an inner position relative to the cam follower, the spring experiences more compression and less torsion; while when said cam is located at an outer position relative to the cam follower, the spring experiences more torsion and less compression.

10. The hinge assembly as claimed in claim 9, wherein said cam is linearly moved by a linearly moveable button with a second spring therebetween to bias both said cam and the button away from each other.

11. The hinge assembly as claimed in claim 9, wherein said cam is essentially located in the cam follower.

12. The hinge assembly as claimed in claim 9, wherein interengagement devices are formed on said cam and the cam follower to retain said cam in either the inner position or the outer position, respectively.

13. The hinge assembly as claimed in claim 12, wherein the cam follower has a cavity defined therein, and a projection of the cam follower extends in the cavity.

14. The hinge assembly as claimed in claim 13, wherein said cam defines a notch and a recess therein for respective engagement of the projection of the cam follower therein.

15. The hinge assembly as claimed in claim 14, further comprising a can rotatable with said cam, wherein the cam follower has an engaging portion formed at one end thereof, and the can defines a groove configured for rotatably receiving the engaging portion.

16. A method of making a hinge device for use with a portable electronic device, comprising steps of:
providing a cam follower;
providing a cam being rotatably engaged with the cam follower, said cam being linearly moveable relative to the cam follower;
providing a biasing force along an axial direction of the engaged cam and cam follower; and
providing a biasing force in a rotation direction of the engaged cam and cam follower, wherein
when said cam is located at a first axial position relative to the cam follower, the spring experiences more compression and less torsion; while when said cam is located at a second axial position relative to the cam follower, the spring experiences more torsion and less compression.

17. The method as claimed in claim 16, further comprising a step of providing means for maintaining said cam in said first axial position and said second axial position, respectively.

18. The method as claimed in claim 17, further comprising a step of providing a can defining a groove therein and a hole for slidably receiving said cam; wherein the cam follower has an engaging portion at one end thereof, and the groove of the can is configured for rotatably receiving the engaging portion.

19. The method as claimed in claim 18, further comprising a step of defining a cavity in the cam follower, whereby a projection is provided on the cam follower in the cavity.

20. The method as claimed in claim 19, further comprising a step of defining a recess and a notch in said cam for respective engagement of the projection of the cam follower therein.

* * * * *